United States Patent
Zaidi et al.

(10) Patent No.: US 6,574,689 B1
(45) Date of Patent: Jun. 3, 2003

(54) METHOD AND APPARATUS FOR LIVE-LOCK PREVENTION

(75) Inventors: Nazar A. Zaidi, San Jose, CA (US); Jeen Miin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/520,424

(22) Filed: Mar. 8, 2000

(51) Int. Cl.⁷ .................................................. G06F 5/00
(52) U.S. Cl. ..................... 710/52; 710/36; 710/112; 711/119
(58) Field of Search ........................... 710/1, 52, 9, 54, 710/112, 36, 39, 40, 53, 55–57; 711/119; 707/533; 712/4, 5

(56) References Cited

U.S. PATENT DOCUMENTS 5,060,154 A * 10/1991 Duncan, IV. ................. 707/533
5,150,463 A * 9/1992 Ward et al. .................. 395/200
5,426,750 A * 6/1995 Becker et al. ............... 395/400
5,490,280 A * 2/1996 Gupta et al. ................. 395/800
5,625,800 A * 4/1997 Brayton et al. .............. 395/500
5,892,957 A * 4/1999 Normoyle et al. ........... 710/263
6,145,054 A * 11/2000 Mehrotra et al. ............ 711/119

* cited by examiner

Primary Examiner—Jeffrey Gaffin
Assistant Examiner—Rijue Mai
(74) Attorney, Agent, or Firm—Pillsbury Winthrop LLP

(57) ABSTRACT

A queuing system that avoids live-locking is provided. A representative implementation of this system 1) selects a first queue item pointed to by a rotating pointer if the first queue item is ready to be serviced, 2) selects a second queue item pointed to by a find-first-pointer if the first queue item is not ready to be serviced, and 3) updates the rotating pointer so that the rotating pointer points to a third queue item.

12 Claims, 2 Drawing Sheets

METHOD AND APPARATUS FOR LIVE-LOCK PREVENTION

FIELD

The present invention is generally related to queuing systems for microprocessors and other environments. More specifically, an embodiment of the present invention includes a method for queuing and servicing requests that prevents the occurrence of live-lock conditions.

BACKGROUND

Computer processors maintain queues for various purposes. These queues are managed using a range of different strategies, depending on the queue's intended uses. First-In-First-Out (FIFO) queues, for example, are used where queued items must be serviced in the order in which they are received. Find-First-One (FF1) queues are a slightly different example. FF1 queues are used where queue items may be served without regard to the order in which they arrive. The entity that services an FF1 queue is free to retrieve any queue item that is ready for service. Typically, this means that the servicing entity simply retrieves the first queue item that is located and is ready for service. This is true even if that item was just added to the queue.

For many applications, queues are maintained using fixed register sets. Thus, an exemplary queue might be maintained in a set of eight, ten or some other number of registers. In the typical case, each register has an associated valid bit. Each bit is turned on to indicate that its associated register contains a queue item that is ready for servicing. The servicing entity toggles these valid bits when it removes items from the queue.

A representative queue of this type is designated 100 in FIG. 1. Queuing system 100 includes a series of registers, of which registers 102a through 102e are representative. Each register 102 has an associated valid bit 104. For a typical FF1 strategy, register 102d would be the first register to be serviced in queuing system 100 (since it is the first register 102 having a set valid bit 104). The servicing entity would clear valid bit 104d to indicate the servicing of register 102d. Assuming no other changes to queuing system 100, register 102e would be the next register to be serviced.

FF1 queues provide a simple, effective and relatively inexpensive queuing strategy. FF1 queuing may be used wherever there is no absolute requirement that queued items be serviced in a particular order. Unfortunately, FF1 queuing can also lead to the creation of a condition known as live-locking where queued items may wait for extended or even indefinite periods for servicing.

Live-locking can be explained by reference to queuing system 100 of FIG. 1. As noted previously, queuing system 100 includes at least two registers (102d and 102e) that are ready for servicing. The FF1 strategy services register 102d first. It is possible that a new item will be added to the queue while register 102d is being serviced. This new item may be placed in any register 102 including now available register 102d. In fact, if new items arrive at a fast enough rate it is possible that register 102d (or a preceding register 102) will always be valid when the servicing entity inspects queuing system 100. If this is the case, the probability of selecting following registers 102 (such as register 102e) becomes diminished. In some cases, the repeated availability of preceding registers 102 will entirely prevent the servicing of subsequent registers 102. This is a live-lock condition.

The potential for live-lock conditions is a major drawback to existing FF1 queuing systems. Within these systems, it is possible for valid items to remain queued indefinitely. In most cases, this means that requested work is not getting done or service is being delayed.

Based on the foregoing, it may be appreciated that there is a need for methods that prevent live-lock conditions in queuing systems. This need is especially acute where FF1 and similar queuing strategies are employed.

SUMMARY

An embodiment of the present invention provides a queuing system that avoids live-locking. A representative implementation of this system 1) selects a first queue item pointed to by a rotating pointer if the first queue item is ready to be serviced, 2) selects a second queue item pointed to by a find-first-pointer if the first queue item is not ready to be serviced, and 3) updates the rotating pointer so that the rotating pointer points to a third queue item.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference will now be made in detail to preferred embodiments of the invention, examples of which are illustrated in the accompanying drawings. Wherever convenient, the same reference numbers will be used throughout the drawings to refer to the same of like parts.

Figure 1:
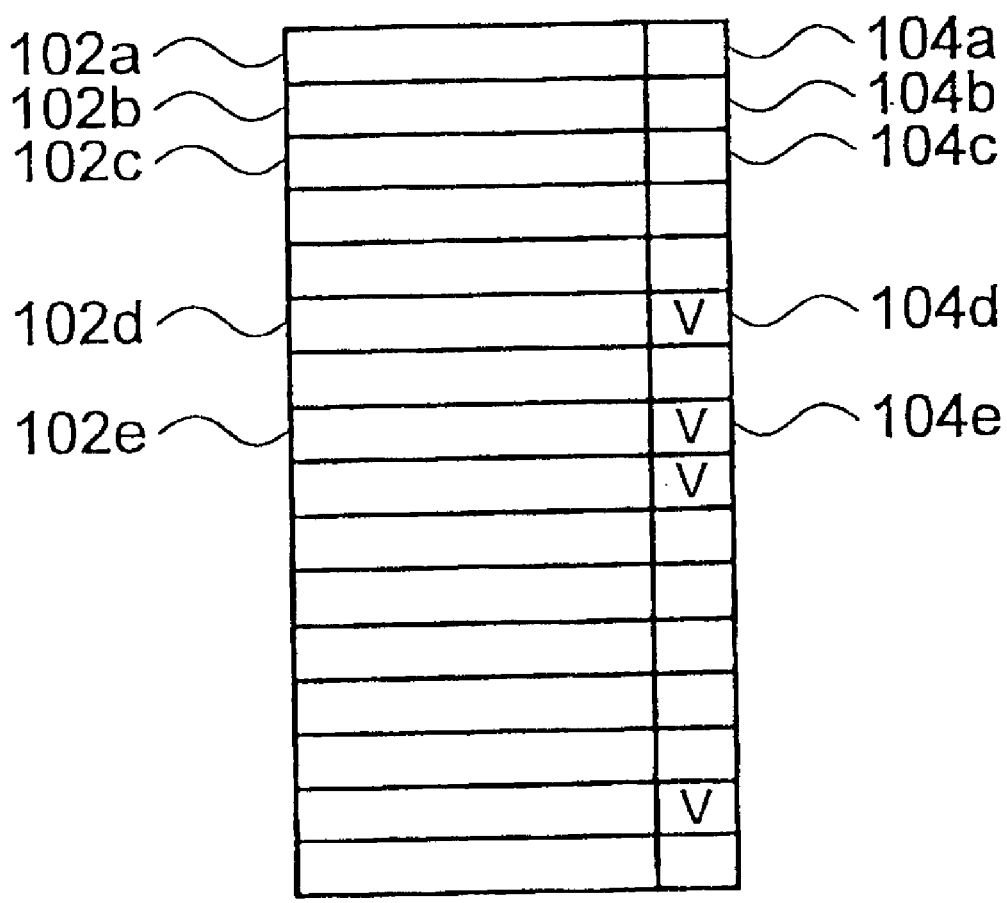
FIG. 1 is a block diagram of a prior art queuing system.
Figure 2:
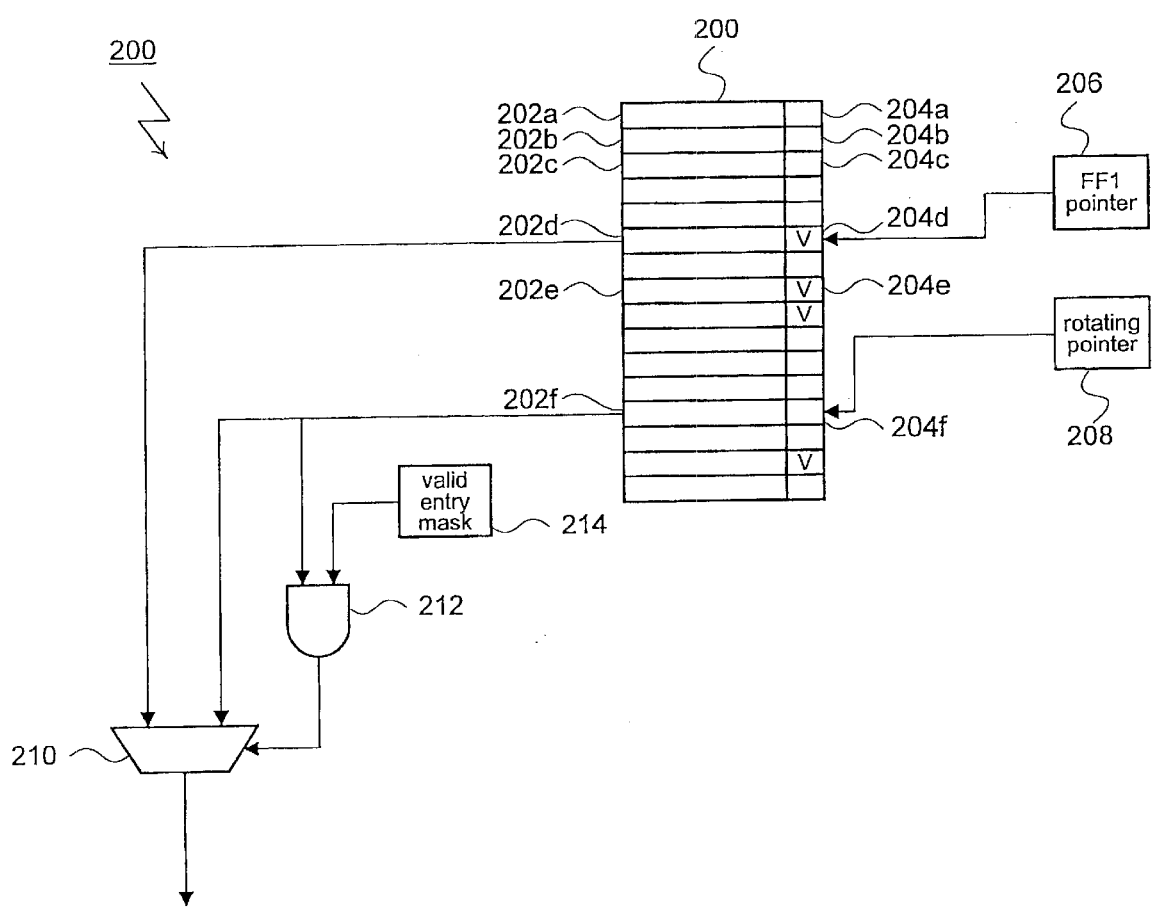
FIG. 2 is a block diagram of a queuing system according to an embodiment of the present invention.

An embodiment of the present invention provides a queuing system that avoids live-locking. A representative implementation for a queuing system of this type is shown in FIG. 2 and designated 200. Queuing system 200 includes a series of registers, of which registers 202a through 202f are representative. Each register 202 has an associated valid bit 204. A set valid bit 204 indicates that the associated register 202 contains a queue entry that is ready for servicing. Queue entries may be added to any register 202 having a clear valid bit 204. For the purposes of description, this means that new queue entries arrive and are assigned to registers 202 in a seemingly random fashion.

Queuing system 200 also includes a find-first pointer 206 and a rotating pointer 208. Find-first pointer 206 represents the output of a find-first queuing strategy applied to queuing system 200. The find-first queuing strategy treats registers 202 as an ordered sequence. The ordered sequence typically starts at register 202a and continues with register 202b, 202c, and so on. For other embodiments, different orderings (e.g., the reverse of the ordering just described) may be used. The find-first queuing strategy selects the first register 202 in the ordered sequence that has a set valid bit 204. Find-first pointer 206 is dynamically updated to point to that first register 202. For typical embodiments, this means that find-first pointer 206 is the output of combinatorial logic configured to detect the first occurrence of a set valid bit 204 the ordered sequence of registers 202.

Rotating point 208 is configured to sequence through the registers 202 in queuing system 200. Typically, this means that rotating point 208 is incremented or decremented by a predetermined value each time an item is removed from queuing system 200. In many cases, rotating pointer 208 will be incremented or decremented by one register following each item removal. It should be appreciated, however, that rotating pointer 208 may be moved by more than a single register and may be updated at other times in place of or in addition to the removal of an item from queuing system 200.

Both find-first pointer 206 and rotating pointer 208 select registers 202 in queuing system 200 (shown as registers 202d and 202f in FIG. 2). Depending on the particular implementation of queuing system 200, registers 202d and 202f may be selected (and output) sequentially or in parallel. These two registers 202, and more generally, whatever registers are selected by find-first pointer 206 and rotating pointer 208, form inputs to multiplexor 210.

The state of the valid bit 204 selected by rotating pointer 208 controls the output of multiplexor 210. In the example of FIG. 2, this means that the output of multiplexor 210 is chosen by valid bit 204f (because register 202f and valid bit 204f are selected by rotating pointer 208). If the selected valid bit is set, multiplexor 210 outputs the content of the register 202 selected by rotating pointer 208. Otherwise, multiplexor 210 outputs the content of the register 202 selected by find-first pointer 206. In the example of FIG. 2, valid bit 204f is not set. As a result, multiplexor 210 outputs the value of register 202d (the register 202 selected by rotating pointer 208). The overall effect is to select the contents of the register 202 pointed to by rotating pointer 208 whenever that register 202 has a set valid bit. If the register 202 pointed to by rotating pointer 208 does not have a set valid bit 204, the register 202 pointed to by the find-first pointer 206 is selected.

Queuing system 200 also includes an AND gate 212 and a valid entry mask 214. AND gate 212 and a valid entry mask 214 are shown as a representative method for isolating the value of valid bits 204 from their associated registers 202. This representative method assumes that the contents of registers 202 and their associated valid bits 204 are intermixed and not separately addressable. In cases where valid bits 204 are stored separately or are otherwise individually addressable AND gate 212 and valid entry mask 214 may be replaced with other suitable methodologies.

Queuing system 200 provides a strategy that largely preserves the simplicity of find-first queuing systems. At the same time, queuing system 200 insures that each queued item will be serviced within a finite time period. In this way, this embodiment of the present invention provides a queuing system that avoids live-locking.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method comprising:
    selecting a first queue item pointed to by a rotating pointer if the first queue item is ready to be serviced;
    selecting a second queue item pointed to by a find-first-pointer if the first queue item is not ready to be serviced, wherein the find-first-pointer is utilized to select the second queue item regardless of an order in which the second queue item arrived;
    updating the rotating pointer, after selecting the first or the second queue item, so that the rotating pointer points to a third queue item.

2. A method as recited in claim 1 further including testing the value of a valid bit associated with the first queue item to determine if the first queue item is ready to be serviced.

3. A method comprising:
    selecting a first queue item pointed to by a rotating pointer if the first queue item is ready to be serviced;
    selecting a second queue item pointed to by a find-first-pointer if the first queue item is not ready to be serviced, wherein the selecting the first queue and the selecting the second queue item are performed by a multiplexor and wherein the multiplexor is controlled by the state of a valid bit associated with the first queue item;
    updating the rotating pointer so that the rotating pointer points to a third queue item; and
    testing the value of the valid bit associated with the first queue item to determine if the first queue item is ready to be serviced.

4. A method as recited in claim 1 wherein the queue items are maintained as a sequence and wherein the method further comprises updating the find-first-pointer to point to the first queue item within the sequence that is ready to be serviced.

5. A method as recited in claim 1 wherein the queue items are maintained as a sequence and wherein the third pointer is sequentially adjacent to the first pointer.

6. A method as recited in claim 5 wherein the sequence of queue items is maintained in a register file.

7. A system which comprises:
    a queue configured to contain items requiring service;
    a rotating pointer that is configured to locate a first item within the queue;
    a find-first pointer configured to locate a second item within the queue, the second item being ready to be serviced, wherein the find-first pointer is utilized to select the second item within the queue regardless of an order in which the second item within the queue arrived; and
    means for selecting the first item or the second item, the first item being chosen if the first item is ready to be serviced, the second item being chosen if the first item is not ready to be serviced.

8. A system as recited in claim 7 further comprising means for updating the rotating pointer following selection of the first item or second item.

9. A system as recited in claim 8 wherein the means for updating the rotating pointer is configured to increment or decrement the rotating pointer to locate an item that sequentially precedes or follows the first item.

10. A system as recited in claim 7 which further comprises a respective valid bit for each item, a set valid bit indicating that the respective item is ready for service.

11. A system which comprises:

a queue configured to contain items requiring service;

a rotating pointer that is configured to locate a first item within the queue;

a find-first pointer configured to locate a second item within the queue, the second item being ready to be serviced;

a multiplexor for selecting the first item or the second item, the first item being chosen if the first item is ready to be serviced, the second item being chosen if the first item is not ready to be serviced; and a respective valid bit for each item, a set valid bit indicating that the respective item is ready for service, wherein the state of the multiplexor is controlled by the state of the valid bit associated with the first item.

12. A system as recited in claim 10 wherein the queue further comprises a sequence of registers and wherein the find first pointer is maintained to point at the first register having a set valid bit.

* * * * *